United States Patent
Gaal

(10) Patent No.: US 9,614,654 B2
(45) Date of Patent: Apr. 4, 2017

(54) ADAPTIVE CONTROL CHANNEL DESIGN FOR BALANCING DATA PAYLOAD SIZE AND DECODING TIME

(71) Applicant: QUALCOMM Incorporated, San Diego, CA (US)

(72) Inventor: Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 131 days.

(21) Appl. No.: 13/633,826

(22) Filed: Oct. 2, 2012

(65) Prior Publication Data

US 2013/0083666 A1    Apr. 4, 2013

Related U.S. Application Data

(60) Provisional application No. 61/542,764, filed on Oct. 3, 2011.

(51) Int. Cl.
H04L 5/00    (2006.01)

(52) U.S. Cl.
CPC .......... *H04L 5/0053* (2013.01); *H04L 5/0058* (2013.01); *H04L 5/0091* (2013.01)

(58) Field of Classification Search
None
See application file for complete search history.

(56) References Cited

U.S. PATENT DOCUMENTS

| 8,094,701 | B2 | 1/2012 | Cozzo | |
| 2004/0081181 | A1* | 4/2004 | Malkamaki | 370/410 |
| 2007/0147289 | A1* | 6/2007 | Nibe | 370/329 |
| 2009/0088148 | A1 | 4/2009 | Chung et al. | |
| 2010/0246721 | A1 | 9/2010 | Chen et al. | |
| 2010/0309788 | A1* | 12/2010 | Ho et al. | 370/236 |
| 2011/0044391 | A1 | 2/2011 | Ji et al. | |
| 2011/0110316 | A1* | 5/2011 | Chen et al. | 370/329 |
| 2011/0128933 | A1* | 6/2011 | Chen et al. | 370/330 |

(Continued)

FOREIGN PATENT DOCUMENTS

| CN | 101809898 A | 8/2010 |
| JP | 2011529662 A | 12/2011 |

(Continued)

OTHER PUBLICATIONS

ETRI: "Discussions on enhanced PDCCH structure", 3GPP Draft; R1-112211 EPDCCH, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 22, 2011, Aug. 16, 2011, XP050537374, [retrieved on Aug. 16, 2011].

(Continued)

*Primary Examiner* — Ayaz Sheikh
*Assistant Examiner* — Peter Chau
(74) *Attorney, Agent, or Firm* — Seyfarth Shaw LLP

(57) ABSTRACT

A method of wireless communication includes allocating transport blocks to a control channel region as a function of the size of the transport block. The user equipment (UE) monitors at least two different control regions in a subframe for control information. The monitored control regions do not overlap in time. The UE receives a subframe including control information in at least one of the two different control regions.

22 Claims, 13 Drawing Sheets

(56) References Cited

U.S. PATENT DOCUMENTS

| | | | |
|---|---|---|---|
| 2011/0170496 A1 | 7/2011 | Fong et al. | |
| 2011/0223924 A1* | 9/2011 | Lohr et al. | 455/450 |
| 2011/0292891 A1 | 12/2011 | Hsieh et al. | |
| 2012/0236783 A1 | 9/2012 | Park et al. | |
| 2013/0039284 A1* | 2/2013 | Marinier et al. | 370/329 |
| 2013/0039291 A1* | 2/2013 | Blankenship et al. | 370/329 |
| 2013/0044664 A1* | 2/2013 | Nory et al. | 370/311 |
| 2013/0163573 A1* | 6/2013 | Oizumi et al. | 370/336 |
| 2014/0008618 A1 | 1/2014 | Lim et al. | |
| 2014/0086188 A1* | 3/2014 | Hoymann et al. | 370/329 |

FOREIGN PATENT DOCUMENTS

| | | | |
|---|---|---|---|
| KR | 20080097678 A | | 11/2008 |
| KR | 20110066108 A | | 6/2011 |
| WO | 2010013961 A2 | | 2/2010 |
| WO | WO2012012889 | * | 4/2012 |
| WO | 2012109542 A1 | | 8/2012 |

OTHER PUBLICATIONS

International Search Report and Written Opinion—PCT/US2012/000450—ISA/EPO—Jul. 26, 2013.

Partial International Search Report—PCT/US2012/000450—ISA/EPO—Apr. 2, 2013.

QUALCOMM Incorporated: "E-PDCCH Requirements", 3GPP Draft; R1-113396 E-PDCCH, 3rd Generation Partnership Project (3GPP), Mobile Competence Centre; 650, Route Des Lucioles; F-06921 Sophia-Antipolis Cedex; France. vol. RAN WG1. No. Zhuhai; Oct. 10, 2011. Oct. 4, 2011 (Oct. 4, 2011). XP050538452, [retrieved on Oct. 4, 2011].

Samsung: "Configuration of PDCCH candidate sets for the control of blind decoding attempts", 3GPP Draft; R1-080675, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; Feb. 11, 2008-Feb. 15, 2008, Feb. 5, 2008, XP050596641, [retrieved on Feb. 5, 2008].

Samsung: "Discussion on ePDCCH Design Issues", 3GPP Draft; R1-112517 EPDCCH, 3RD Generation Partnership Project (3GPP), Mobile Competence Centre ; 650, Route Des Lucioles ; F-06921 Sophia-Antipolis Cedex ; France, vol. RAN WG1, No. Athens, Greece; Aug. 22, 2011, Aug. 16, 2011, XP050537597, [retrieved on Aug. 16, 2011].

LG Electronics: "TBS Determination for Un link", 3GPP Draft; R1-106139, 3RD Generation Partnership Project (3GPP), Mobile Competence Centre; 650, Route Des Lucioles; F-06921 Sophia-Antipolis Cedex; France, vol. RAN WG1, no. Jacksonville, USA; Nov. 15, 2010, Nov. 9, 2010 (Nov. 9, 2010), KP050466883, 4 pages.

* cited by examiner

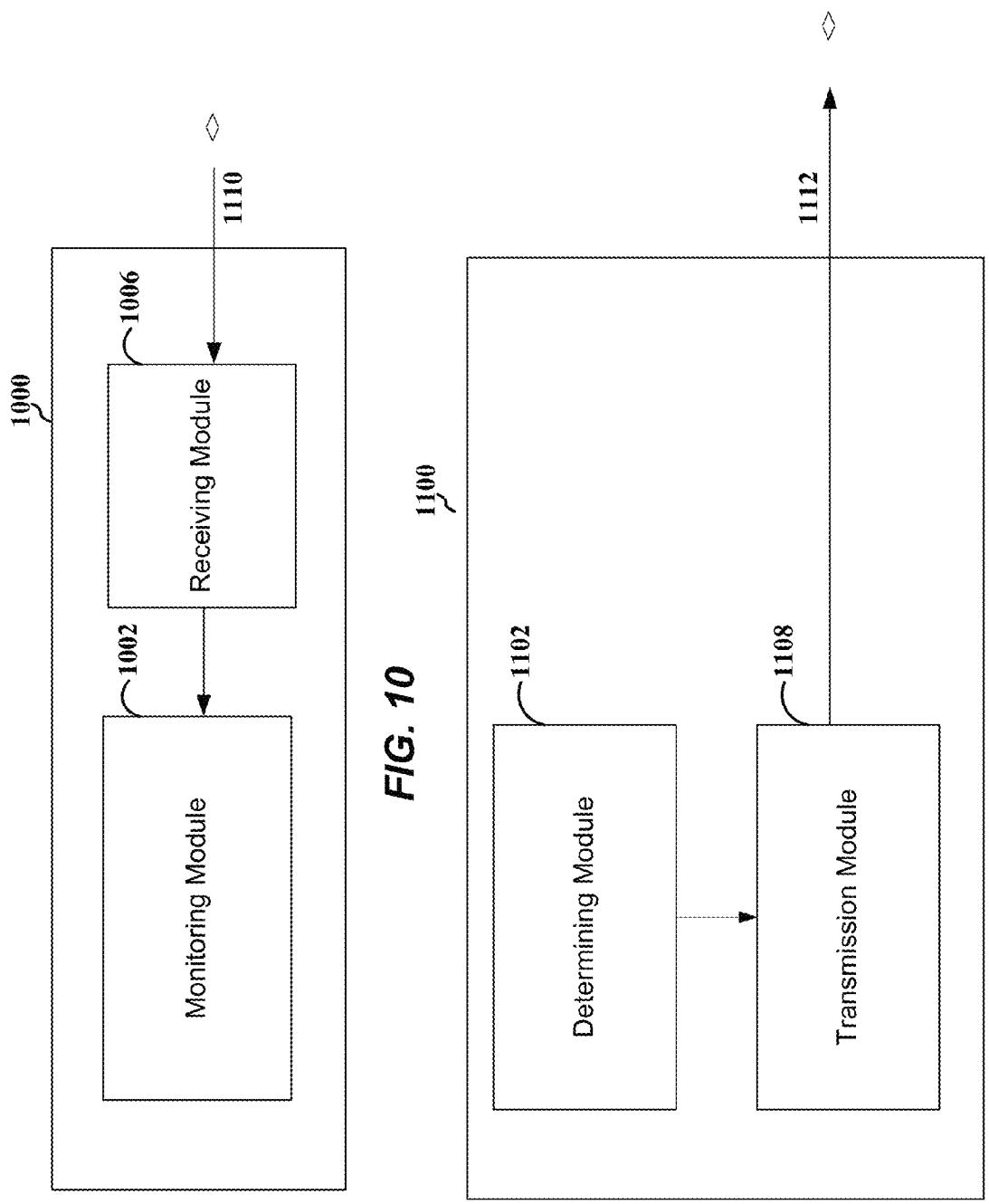

ADAPTIVE CONTROL CHANNEL DESIGN FOR BALANCING DATA PAYLOAD SIZE AND DECODING TIME

CROSS-REFERENCE TO RELATED APPLICATION

This application claims the benefit under 35 U.S.C. §119(e) to U.S. Provisional Patent Application No. 61/542,764 entitled "ADAPTIVE CONTROL CHANNEL DESIGN FOR BALANCING DATA PAYLOAD SIZE AND DECODING TIME," filed on Oct. 3, 2011, the disclosure of which is expressly incorporated by reference herein in its entirety.

BACKGROUND

Field

Aspects of the present disclosure relate generally to wireless communication systems, and more particularly to allocating transport blocks to a control channel region as a function of the size of the transport block.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one aspect, a method of wireless communication is disclosed. The method includes monitoring at least two different control regions in a subframe for control information, were the two control regions do not overlap in time. The method also includes receiving the subframe including control information in at least one of the two different control regions.

Another aspect discloses a method of wireless communication including determining a control region to use for transmitting control information to a receiver based on a transport block size. The method also includes transmitting control information in the determined control region.

In another aspect, a wireless communication having a memory and at least one processor coupled to the memory is disclosed. The processor(s) is configured to monitor at least two different control regions in a subframe for control information. The two control regions do not overlap in time. The processor(s) is also configured to receive the subframe including control information in at least one of the two different control regions.

Another aspect discloses wireless communication having a memory and at least one processor coupled to the memory. The processor(s) is configured to determine a control region to use for transmitting control information to a receiver based on a transport block size. The processor(s) is also configured to transmit control information in the determined control region.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of monitoring at least two different control regions in a subframe for control information, in which the two control regions do not overlap in time. The program code also causes the processor(s) to receive the subframe including control information in at least one of the two different control regions.

Another aspect discloses a computer program product for wireless communications in a wireless network having a non-transitory computer-readable medium is disclosed. The computer readable medium has non-transitory program code recorded thereon which, when executed by the processor(s), causes the processor(s) to perform operations of determining a control region to use for transmitting control information to a receiver based on a transport block size. The program code also causes the processor(s) to transmit control information in the determined control region.

In another aspect, an apparatus including means for monitoring at least two different control regions in a subframe for control information is disclosed. The monitored control regions do not overlap in time. Also included is a means for receiving the subframe including control information in at least one of the two different control regions.

Another aspect discloses an apparatus including means for determining a control region to use for transmitting control information to a receiver based on a transport block size. Also included is a means for transmitting control information in the determined control region.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 10 and 11 are conceptual data flow diagrams illustrating the data flow between different modules/means/components in an exemplary apparatus.

DETAILED DESCRIPTION

Figure 1:
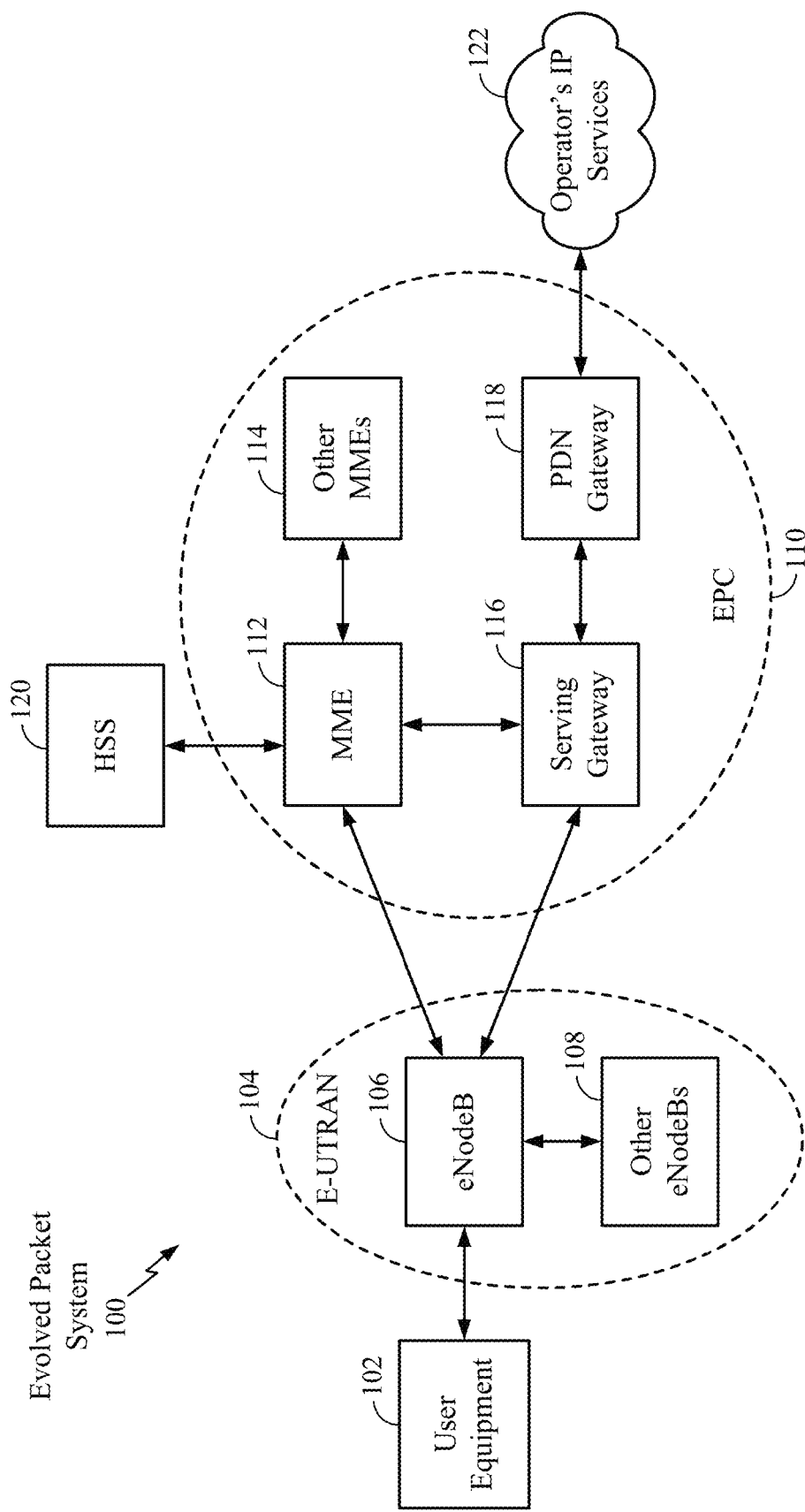
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
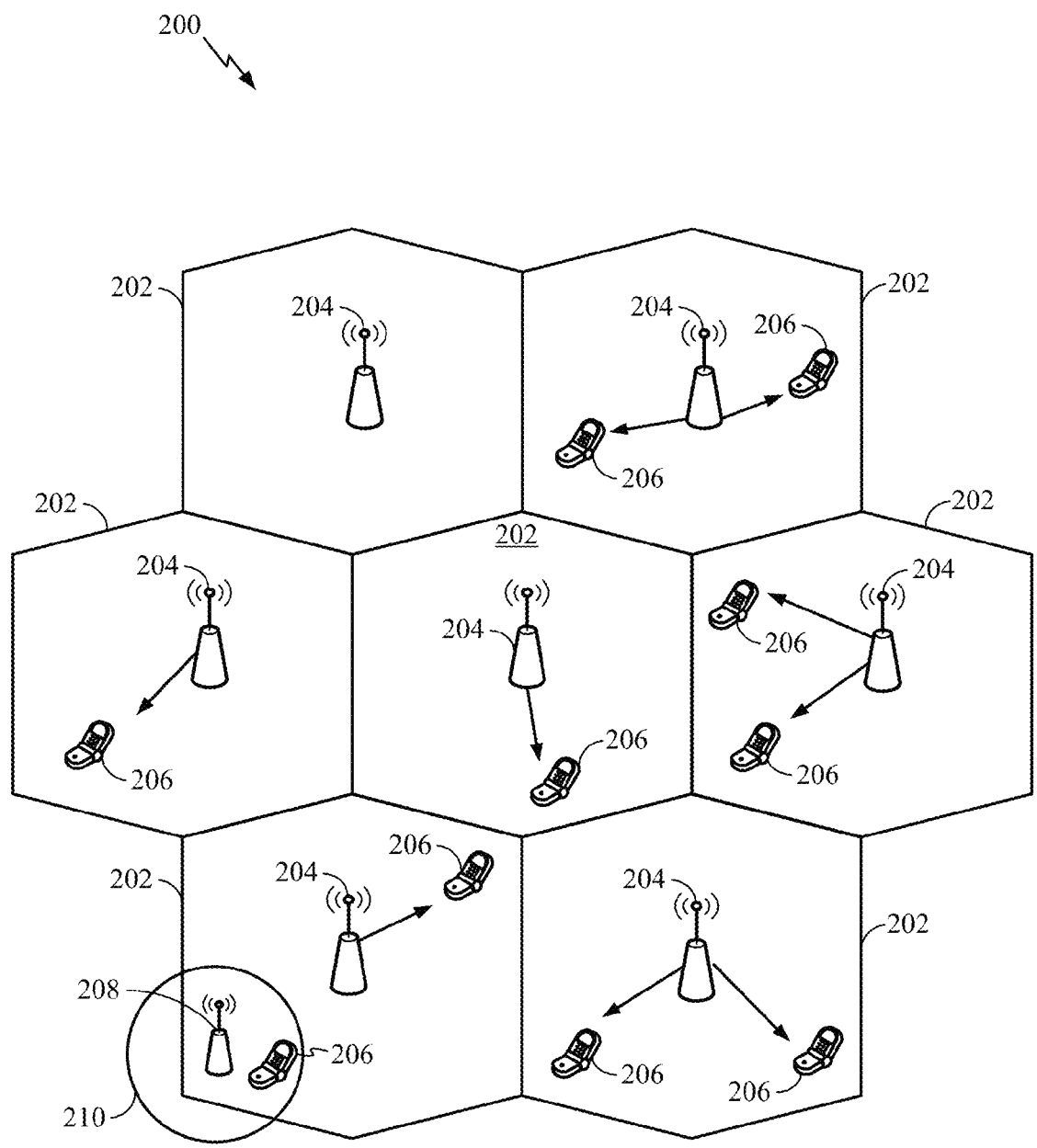
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
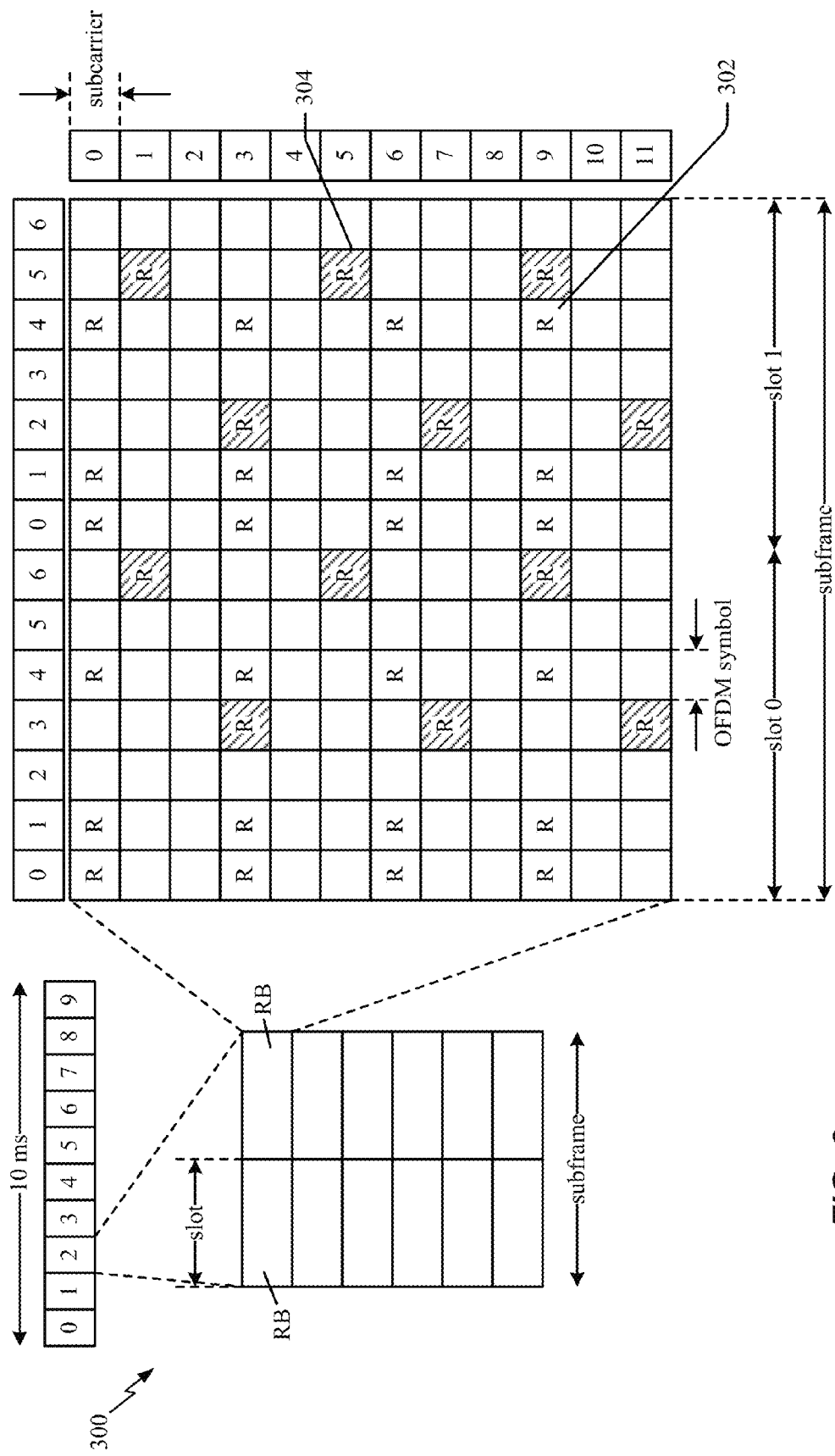
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
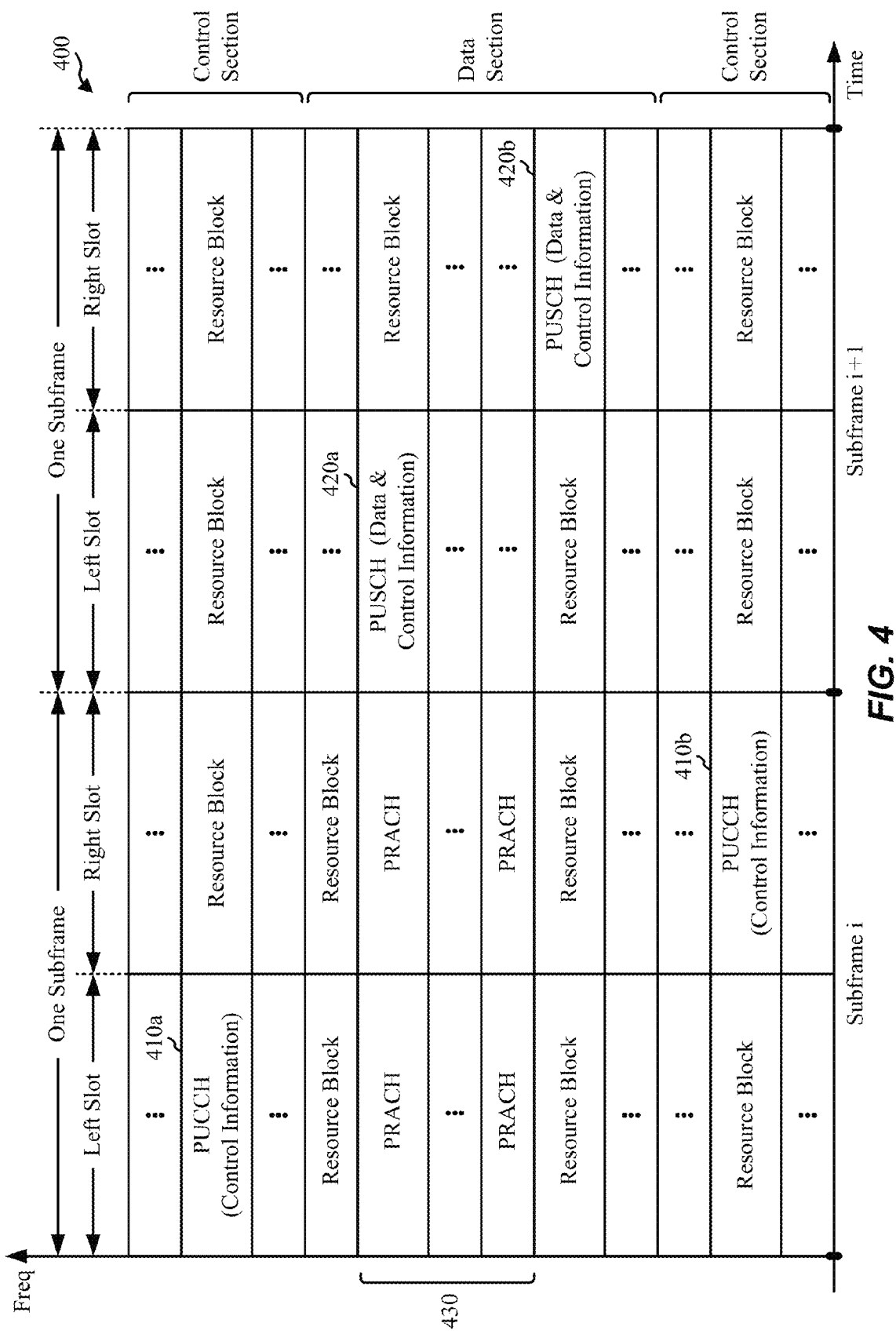
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
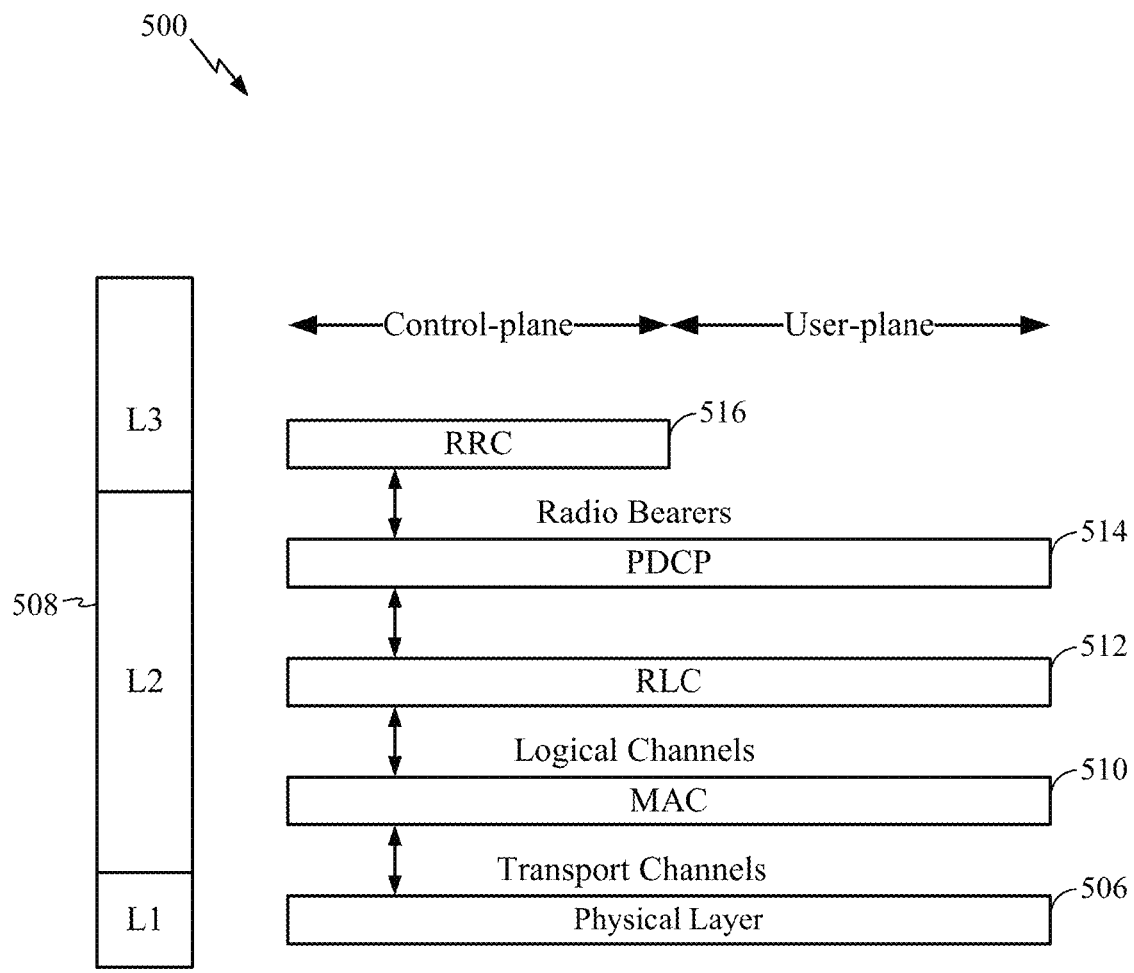
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
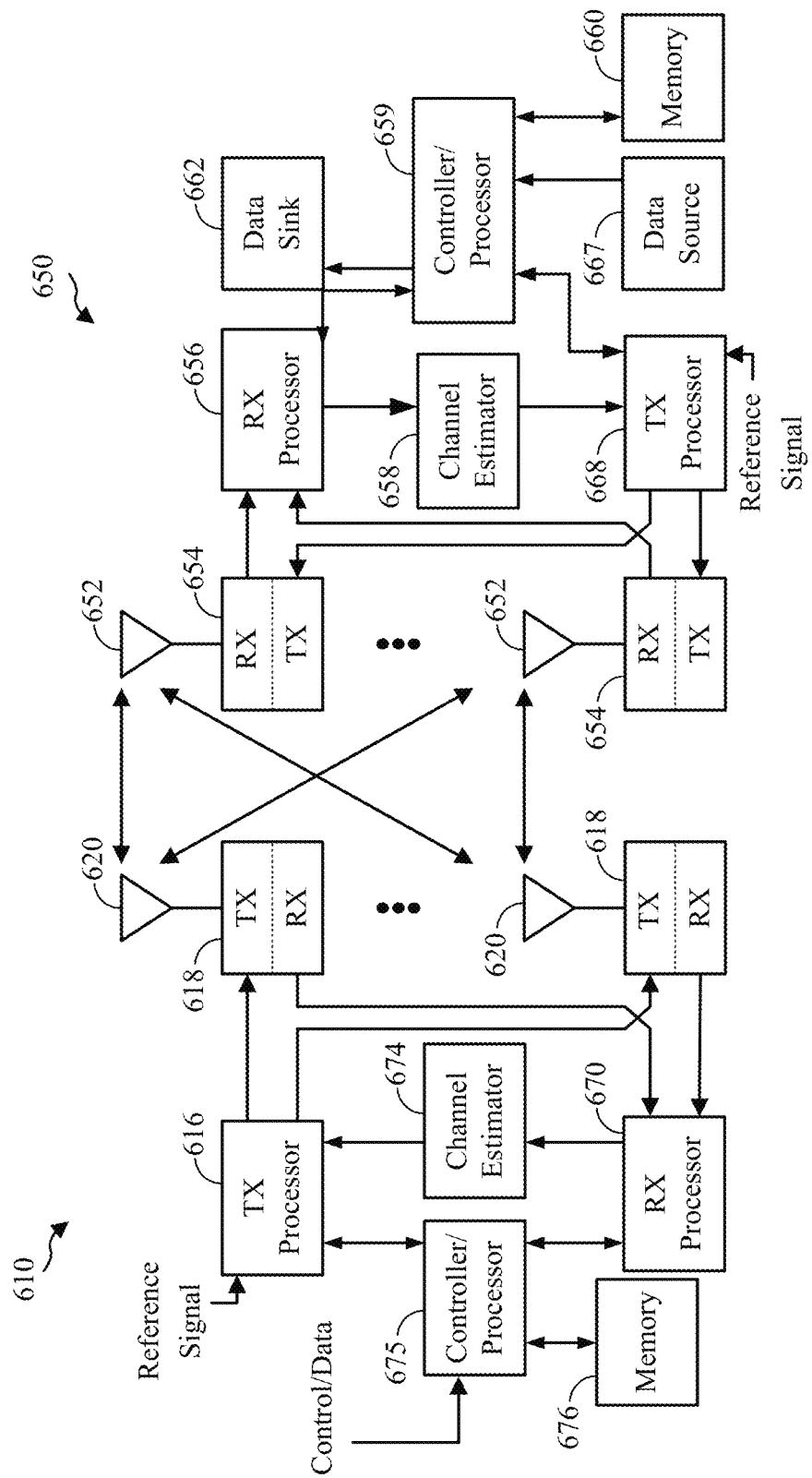
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Adaptive Control Channel Design for Balancing Data Payload Size and Decoding Time In LTE Release 8, 9, and 10, the physical downlink control channel (PDCCH) is located within the first several symbols (e.g., one, two, three, or four) in a subframe and is fully distributed across the entire system bandwidth. Additionally, the physical downlink control channel is time domain multiplexed (TDM'ed) with a shared control channel, such as PDSCH, which effectively divides a subframe into a control region and a data region.

In Release 11, coordinated multipoint transmission (CoMP) schemes are supported. This feature provides an interference mitigation technique for improving overall communication performance. With CoMP, multiple base stations (e.g., eNodeBs 110) collaborate to transmit data on the downlink and/or to receive on the uplink to/from one or more UEs. Downlink CoMP and uplink CoMP can be separately or jointed enabled for a UE. Some examples of CoMP schemes are described as follows. In joint transmission (directed to downlink CoMP), multiple eNodeBs transmit the same data meant for a UE. In joint reception (directed to uplink CoMP), multiple eNodeBs receive the same data meant for a UE. In coordinated beam forming, an eNodeB transmits to its UE using beams that are chosen to reduce interference to UEs in neighboring cells. In dynamic point(s) selection, the cell(s) involved in data transmissions may change from subframe to subframe. CoMP may exist in homogeneous networks and/or heterogeneous networks (HetNet). The connection between the nodes involved in CoMP can be X2 or fiber. In heterogeneous network CoMP, low power nodes may include remote radio heads (RRH).

The conventional physical downlink control channel does not include sufficient control capacity for coordinated multipoint (CoMP) scenarios. In particular, CoMP scenario 4 occurs when a macro eNodeB and connected remote radio heads (RRHs) use the same cell identification but transmit potentially different data in a coordinated fashion.

An enhanced physical downlink control channel (ePDCCH) may improve control link performance for downlink coverage enhancements and may also provide a control channel solution for extension carriers. Extension carriers are non-standalone carriers that may not specify a legacy control region.

Those skilled in the art will appreciate that physical downlink control channel enhancement techniques have included using a new control region, linking efficiency gain with beamforming, using higher order modulation to conserve resources, and multiple user-multiple input multiple output (MU-MIMO) multiplexing.

LTE Release 11 includes an enhanced physical downlink control channel and other channels, such as an enhanced PCFICH (ePCFICH) and an enhanced PHICH (ePHICH). In contrast to the conventional PDCCH (e.g., legacy PDCCH), which occupies the first several control symbols in a subframe, the enhanced physical downlink control channel occupies the data region of the subframe, similar to the PDSCH. The enhanced physical downlink control channel may increase control channel capacity, support frequency-domain inter-cell interference coordination (ICIC), improve spatial reuse of control channel resources, support beamforming and/or diversity, and operate on the new carrier type and in MBSFN subframes. Furthermore, the enhanced physical downlink control channel may coexist on the same carrier as legacy UEs.

Figure 7:
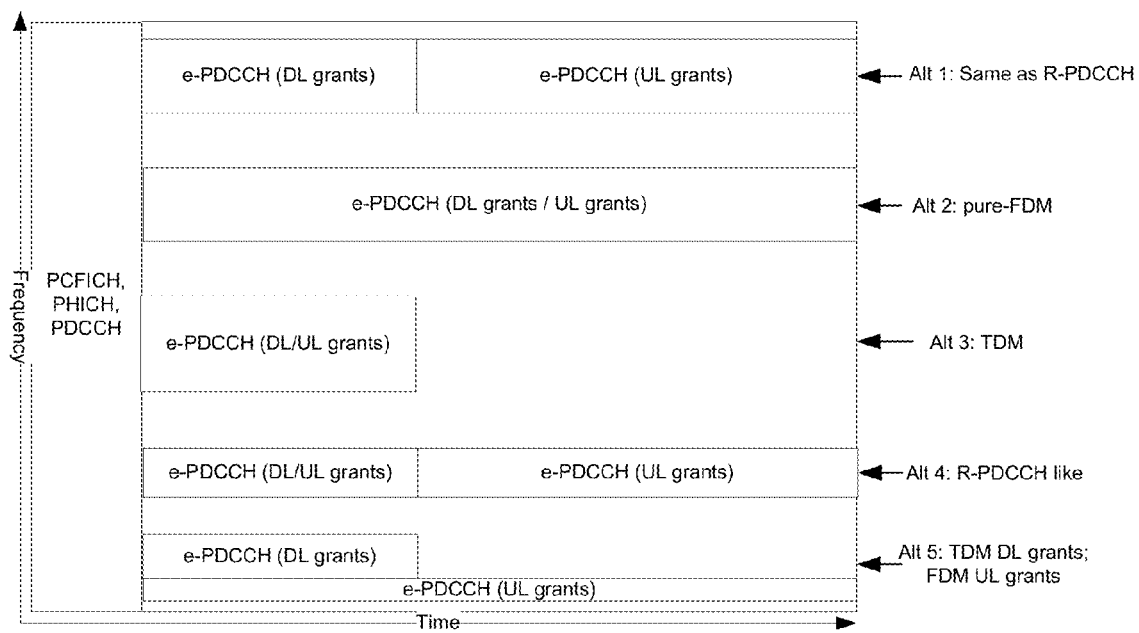
FIG. 7 illustrates examples of an enhanced physical downlink control channel.

FIG. 7 illustrates various enhanced physical downlink control channel structures (Alt 1-Alt 5). For example, in some cases, the enhanced physical downlink control channel structure may be the same as an R-PDCCH structure (Alt 1). Alternately, the enhanced physical downlink control channel may be frequency division multiplexed (FDM'ed) with a data region (Alt 2). Moreover, in an alternate structure, the enhanced physical downlink control channel structure may be time division multiplexed (TDM'ed) with the data region (Alt 3). Alternately, the enhanced physical downlink control channel may be similar, but not the same as R-PDCCH (Alt 4). In another alternate structure, the enhanced physical downlink control channel may combine TDM and FDM (Alt 5). For example, the downlink grants may be time division multiplexed with the data region whereas the uplink grants may be frequency division multiplexed with the data region.

The present disclosure provides aspects for the mapping an enhanced physical downlink control channel in the presence of other signals. The other signals may potentially include common reference signals (CRSs), a legacy control region, PSS/SSS, PBCH, PRSs (positioning reference signals), channel state information reference signals (CSI-RSs), and/or demodulation reference signals (DM-RSs).

Figure 8:
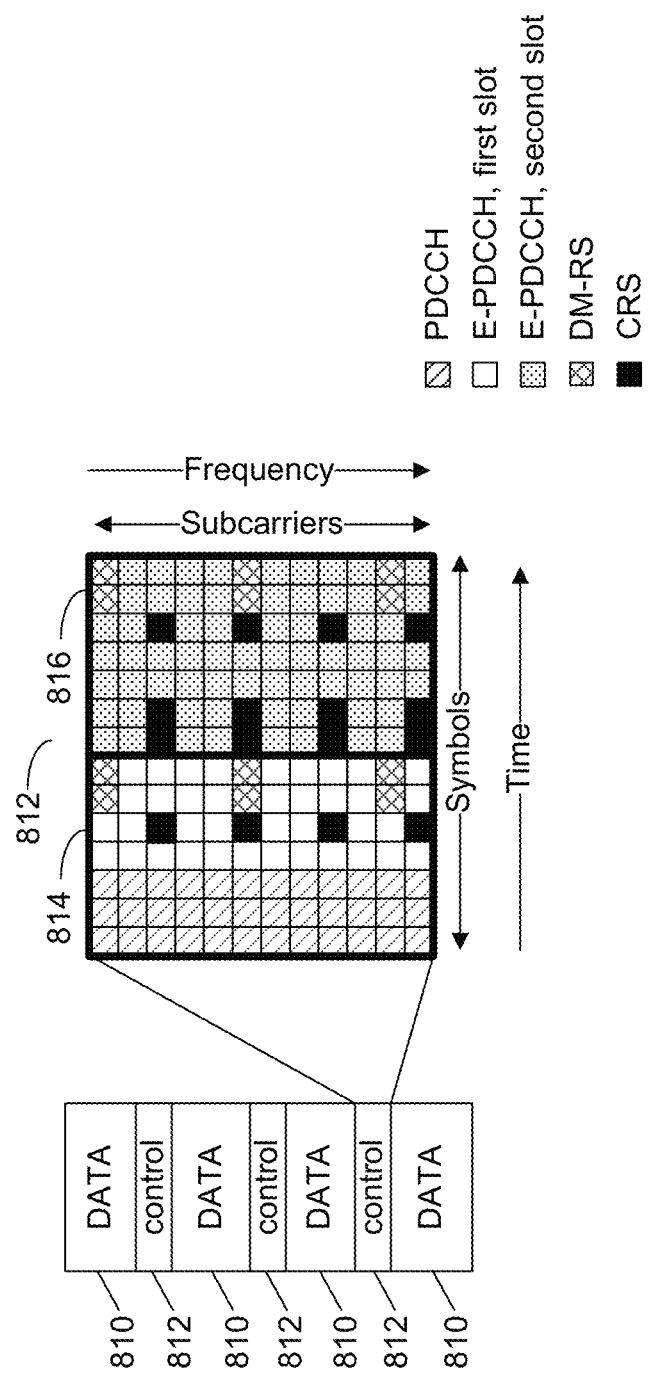
FIG. 8 illustrates a block diagram illustrating resource arrangements according to an aspect of the present disclosure.

FIG. 8 illustrates a block diagram illustrating resource arrangements according to an aspect of the present disclosure. The block includes data subframes 810 and control subframes 812. The control subframe 812 comprises two slots 814 and 816, and each slot 814 and 816 includes resource elements. That is, each slot includes seven OFDM symbols in the time domain and twelve subcarriers in a frequency domain, and each slot comprises resource elements that may be grouped as resource blocks (RBs). Within a slot of the control subframe 812, as previously discussed, the legacy control region (PDCCH) is allocated to the first one, two, or three OFDM symbols. In some cases, such as the 1.4 MHz bandwidth, the legacy control region is allocated to the first four OFDM symbols. According to an aspect of the present disclosure, the new control region (ePDCCH) is allocated to resource elements of one or more slots that are not allocated by the legacy control region, a CRS, or a DM-RS.

As shown in FIG. 8, according to an aspect, the legacy control region is allocated to the first three OFDM symbols of the control subframe 812. Furthermore, some of the resource elements of the first and second slots 814 and 816 are allocated to the CRS and the DM-RS. Finally, the new control region is allocated to the remaining resource elements of the first slot 814 and also the remaining resource elements of the second slot 816. The remaining resource elements refer to resource elements that are not allocated to the legacy control region, the CRS, or the DM-RS.

Although FIG. 8 illustrates the new control region occupying all of the remaining resource elements of the first and second slots, the present disclosure is not limited to the new control region occupying all of the remaining resource elements of a subframe. Specifically, the new control region may be allocated to some or all of the remaining resource elements of the first slot and/or the second slot. Furthermore, aspects of the present disclosure provide for the new control region occupying resource elements of one or two slots, however, the new control region may be divided into other sizes, and is not limited to the two slots of a subframe.

In LTE Release 8, 9, and 10, the turnaround time for UE acknowledgement (ACK) is 4 ms. For example, the UE may transmit a positive or negative ACK in subframe n+4 if the PDCCH and PDSCH are transmitted to a UE in subframe n. According to an aspect, the decoding time for the new control region is reduced. For example, the decoding time may be reduced to 2.5-3 ms. In particular, the decoding time is reduced to about 3 ms if the new control region only occupies the unoccupied resource elements of the first slot. Additionally, the decoding time is reduced to approximately 2.5-3 ms if new control region occupies the unoccupied resource elements of the second slot, or the unoccupied resource elements of both the first and second slots.

It should be noted that in a conventional system, the reduced decoding times is only available via a redesign of the demodulation back end hardware. Accordingly, aspects of the present disclosure provide for a reduced decoding time without hardware modifications.

In one aspect, the maximum transport block size (TBS) is limited as a function of the available decoding time. For example, for a legacy control region, the maximum transport block size (Max_TBS) maybe be expressed as:

$$\text{Max\_TBS} = C_{max} \quad (1)$$

For the new control region, when the new control region occupies resource elements of only the first slot, the maximum transport block size may be expressed as:

$$\text{Max\_TBS} = C_{max}/x \quad (2)$$

Furthermore, for the new control region, when the new control region occupies resource elements of the first slot and the second slot, the maximum transport block size may be expressed as:

$$\text{Max\_TBS} = C_{max}/y \quad (3)$$

In EQUATIONS 1, 2, and 3, $C_{max}$ is the maximum transport block size allowed by the UE category. Parameters x and y are chosen parameters, with both x and y being greater than or equal to one. The parameters x and y may be selected based on various factors, such as, the new control region decoding time, symbol pre-processing time, MIMO mode, transmission rank, or use of UE interference cancellation.

Although the maximum transport size specifies which slot may be used, the specification is not exclusive. For example, the transport block may be allocated to the first slot or the legacy control region even if the maximum transport size designates the second slot for the new control region. Similarly, the transport block may be allocated to the legacy control region even if the first slot is designated for the new control region.

In some cases, up to two transport blocks (TBs) may be used in a multiple input multiple output (MIMO) system. Thus, the combined MIMO transport block size may be considered. Alternatively, the transport block size may be compared with a different $C_{max}$ when allocating MIMO transport blocks.

In one aspect, the common search space control messages may be transmitted in the legacy control region. Because legacy UEs may be present in a network, the legacy control region is specified for all or most subframes. The legacy control region and the new control region may be present in the same subframe. Still, when the new control region is specified for a subframe, the number of OFDM symbols allocated to the legacy subframe may be reduced in comparison to the number of OFDM symbols occupied with the new control region is not used. The number of OFDM symbol occupied is reduced due to control off-load.

A UE may be semi-statically configured to monitor a UE-specific search space in either the legacy control region or the new control region. The UE may also be requested to monitor both the legacy control region and the new control region. The control may be sent based on the size of the transport block. Furthermore, the decoding time specified for a large transport block may be greater than the decoding time specified for a small transport block.

In some cases, so as not to increase the number of blind decodes performed by the UE, the UE-specific search space may be in either the legacy control region or the new control region. The common search space would remain in the legacy control region.

In another aspect, the search space may be divided based on an aggregation size. For example, when an aggregation level is one, the UE may first monitor two decoding hypotheses (i.e. decoding candidates) in the legacy control region and then monitor four decoding hypotheses in the new control region. Furthermore, when the aggregation level is two, the UE can first monitor two decoding hypotheses (i.e. decoding candidates) in the legacy control region and then monitor four decoding hypotheses in the new control region. Furthermore, when the aggregation level is four the UE can first monitor one decoding hypothesis in the legacy control region and then monitor one decoding hypothesis in the new control region. Moreover, when the aggregation level is eight the UE may only monitor the legacy control region. The aggregation level dependent division of the decoding hypotheses (decoding candidates) may be specified in the standard or semi-statically configured for the UE. Still, the common search space (e.g., broadcast SIBs (system information blocks) may remain in the legacy control region.

According to aspects of the present disclosure, the existing demodulating hardware can be reused by limiting the maximum transport block size (TBS) as a function of the E-PDCCH duration. Furthermore, the decoding time is reduced for a small transport block size, and therefore, the new control region may be specified. For a large transport block size, the control information may be specified in the legacy control region because there are only a few UEs scheduled due to the limitation represented by cell capacity.

In some cases, when the new control region is used with beamforming for coverage extension purposes, the signal to noise ratio (SNR) is moderate. Therefore, maximum transport block size may be naturally limited. Accordingly, the decoding time may be reduced and the use of the new control region is viable.

Figure 9A:
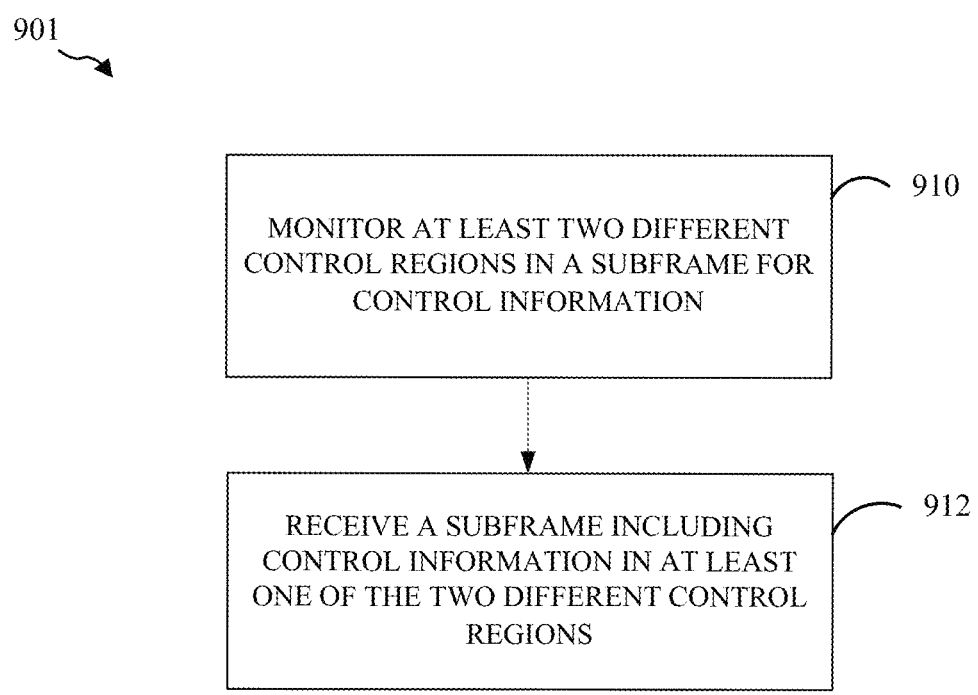
FIGS. 9A and 9B are block diagrams illustrating a method for allocating transport blocks to a control channel region.

FIG. 9A illustrates a method 901 for monitoring control regions. In block 910, a UE (user equipment) monitors at least two different control regions in a subframe for control information. The control regions do not overlap in time. In block 912, the UE receives a subframe including control information in at least one of the two different control regions.

Figure 9B:
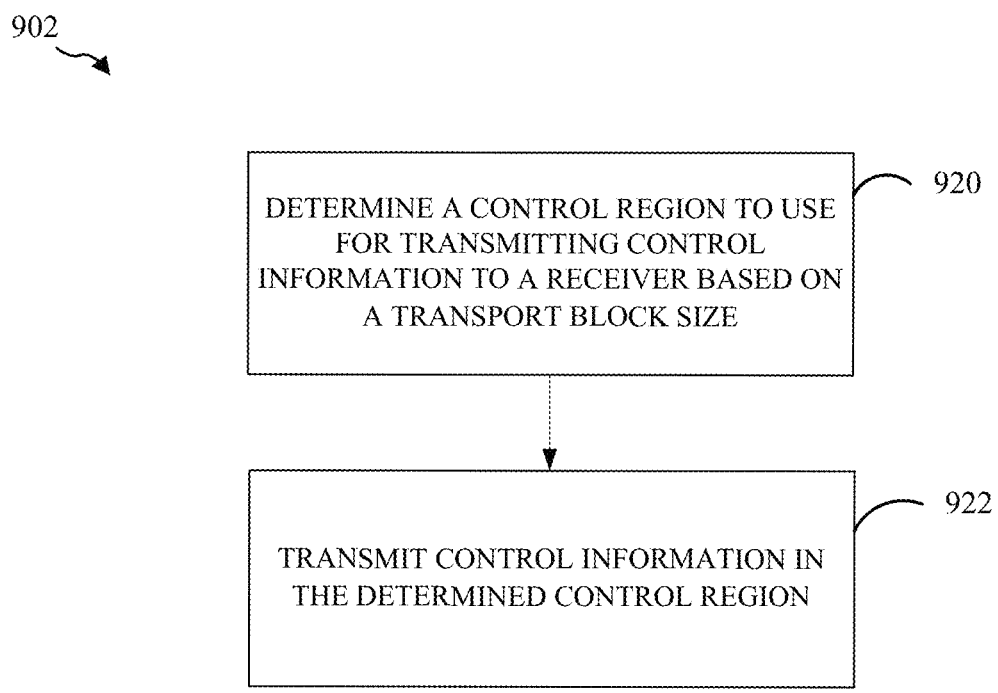

FIG. 9B illustrates a method 902 for limiting transport block size. In block 920, an eNodeB determines a control region to use for transmitting control information to a receiver based on a transport block size. In block 922, the eNodeB transmits control information in the determined control region.

In one configuration, the eNodeB 610 is configured for wireless communication including means for determining. In one aspect, the determining means may be the controller/processor 675 and memory 676 configured to perform the functions recited by the determining means. The eNodeB 610 is also configured to include a means for transmitting. In one aspect, the transmitting means may be the transmit processor 616, modulators 618 and antenna 620 configured to perform the functions recited by the transmitting means. In another aspect, the aforementioned means may be any module or any apparatus configured to perform the functions recited by the aforementioned means.

In one configuration, the UE 650 is configured for wireless communication including means for monitoring. In one aspect, the monitoring means may be the controller/processor 659, receive processor 656, modulators 654, and antenna 652 configured to perform the functions recited by the monitoring means. The UE 650 is also configured to include a means for receiving. In one aspect, the receiving means may be the controller/processor 659, receive processor 656, modulators 654, and antenna 652 configured to perform the functions recited by the receiving means. In another aspect, the aforementioned means may be any module or any apparatus configured to perform the functions recited by the aforementioned means.

FIG. 10 is a conceptual data flow diagram illustrating the data flow between different modules/means/components in an exemplary apparatus 1000. The apparatus 1000 includes a monitoring module 1002 that monitors at least two different control regions in a subframe for control information. The monitoring module 1002 monitors the control regions of subframes received via the receiving module 1006. The receiving module 1006 receives subframes on a signal 1010. Furthermore, the receiving module 1006 may also receive a subframe including control information in at least one of the two different control regions. The apparatus may include additional modules that perform each of the steps of the algorithm in the aforementioned flow charts FIGS. 9A and 9B. As such, each step in the aforementioned flow charts FIGS. 9A and 9B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

FIG. 11 is a conceptual data flow diagram illustrating the data flow between different modules/means/components in an exemplary apparatus 1100. The apparatus 1100 includes a determining module 1102 that determines a control region to use for transmitting control information to a receiver based on a transport block size. The determining module 1102 may then control a transmission module 1108 to transmit control information in the determined control region. The control information may be transmitted via a signal 1112 transmitted via the transmission module 1108. The apparatus may include additional modules that perform each of the steps of the algorithm in the aforementioned flow charts FIGS. 9A and 9B. As such, each step in the aforementioned flow charts FIGS. 9A and 9B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
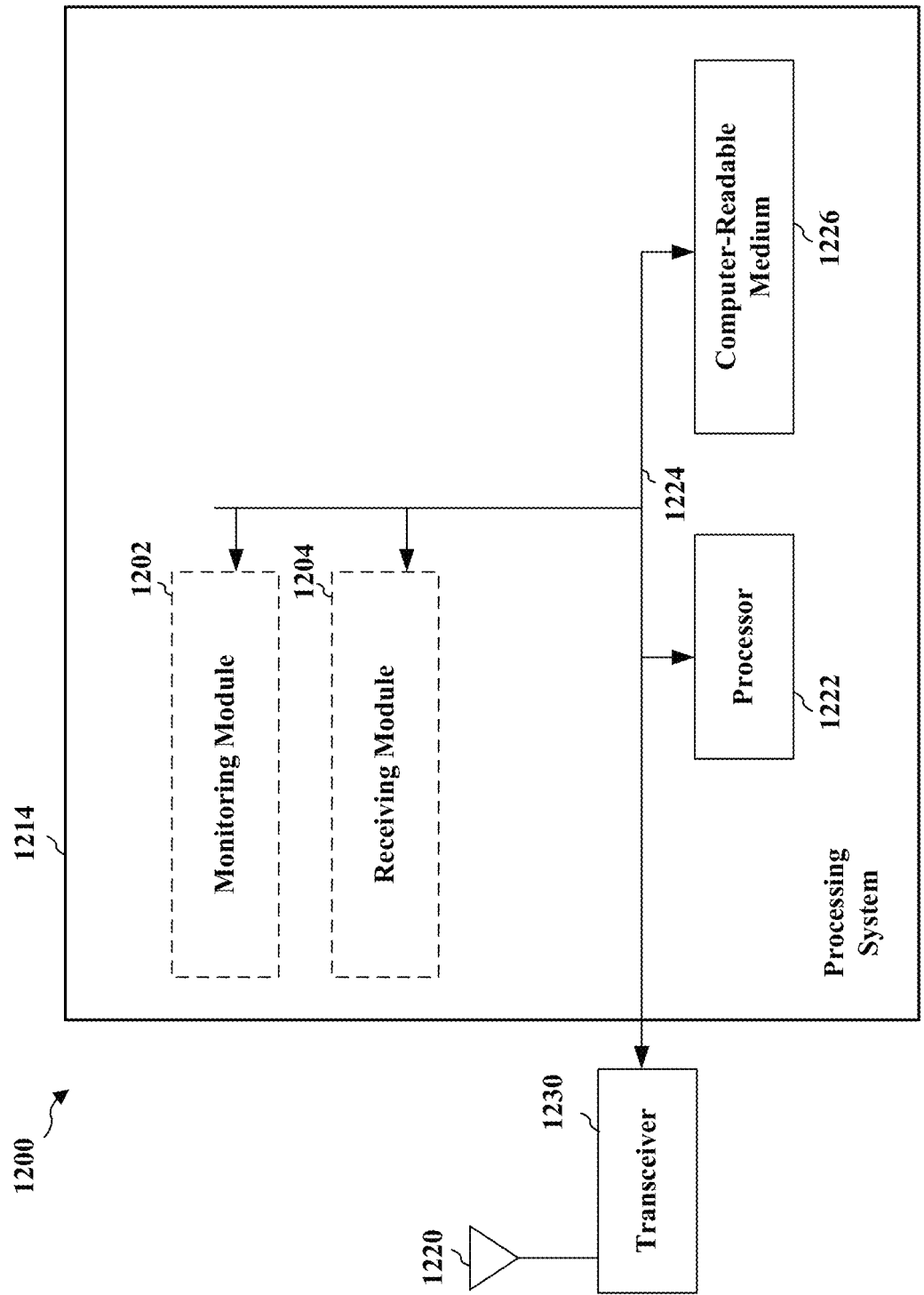
FIGS. 12 and 13 are block diagrams illustrating different modules/means/components in an exemplary apparatus.

FIG. 12 is a diagram illustrating an example of a hardware implementation for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1222 the modules 1202, 1204, 1206 and the computer-readable medium 1226. The bus 1224 may also link various other circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system 1214 includes a monitoring module 1202 for monitoring at least two different control regions in a subframe for control information. The processing system 1214 also includes a receiving module 1204 for receiving a subframe including control information in at least one of the two different control regions. The modules may be software modules running in the processor 1222, resident/stored in the computer-readable medium 1226, one or more hardware modules coupled to the processor 1222, or some combination thereof. The processing system 1214 may be a component of the UE 650 and may include the memory 660, and/or the controller/processor 659.

Figure 13:
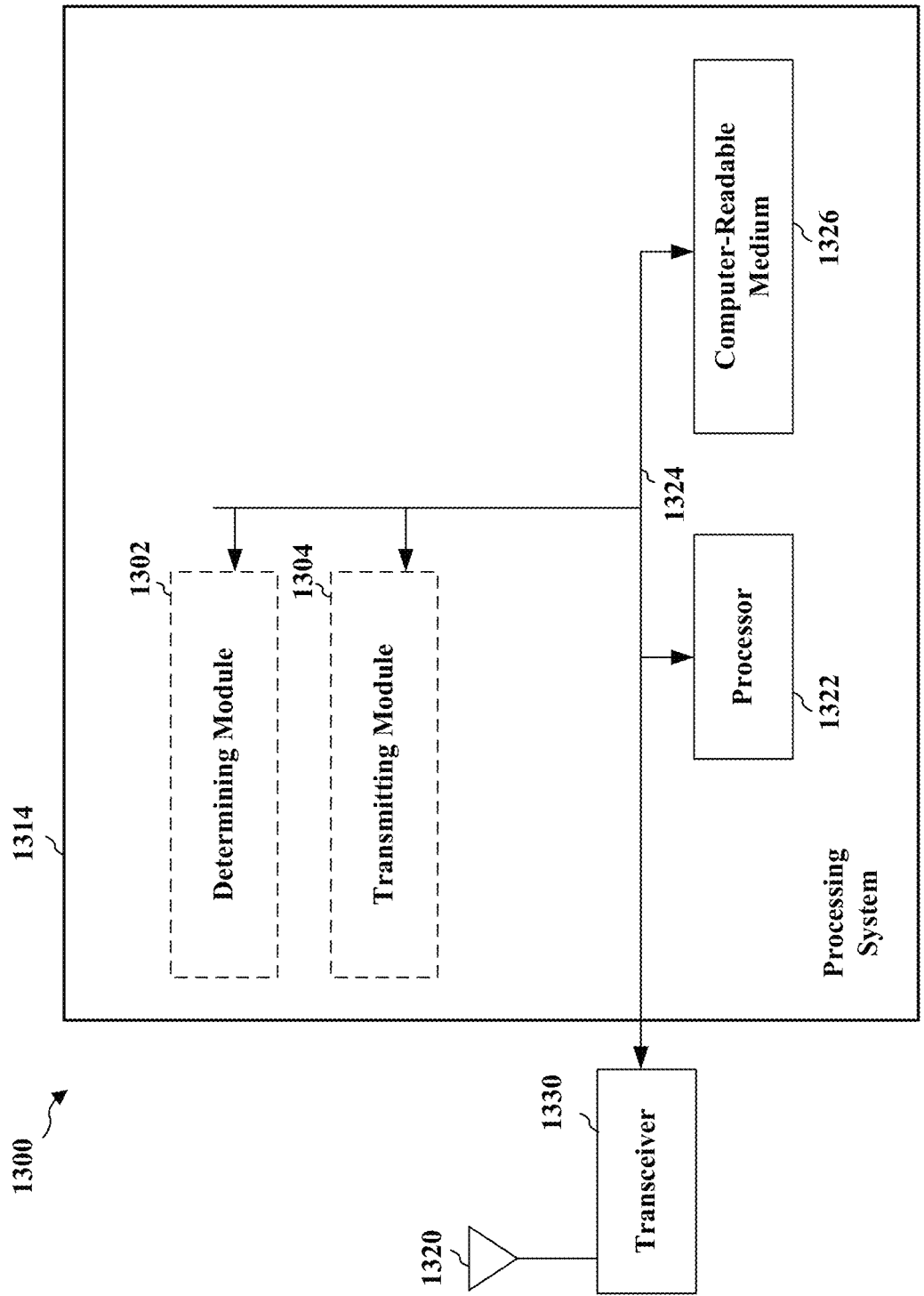

FIG. 13 is a diagram illustrating an example of a hardware implementation for an apparatus 1300 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1322 the modules 1302, 1304, 1306 and the computer-readable medium 1326. The bus 1324 may also link various other circuits such as timing sources, peripherals, voltage regulators, and power management circuits, which are well known in the art, and therefore, will not be described any further.

The apparatus includes a processing system 1314 coupled to a transceiver 1330. The transceiver 1330 is coupled to one or more antennas 1320. The transceiver 1330 enables communicating with various other apparatus over a transmission medium. The processing system 1314 includes a processor 1322 coupled to a computer-readable medium 1326. The processor 1322 is responsible for general processing, including the execution of software stored on the computer-readable medium 1326. The software, when executed by the processor 1322, causes the processing system 1314 to perform the various functions described for any particular apparatus. The computer-readable medium 1326 may also be used for storing data that is manipulated by the processor 1322 when executing software.

The processing system 1314 includes a determining module 1302 for determining a control region to use for transmitting control information to a receiver based on a transport block size. The processing system 1314 also includes a transmitting module 1304 for transmitting control information in the determined control region. The modules may be software modules running in the processor 1322, resident/stored in the computer-readable medium 1326, one or more hardware modules coupled to the processor 1322, or some combination thereof. The processing system 1314 may be a component of the eNodeB 610 and may include the memory 676, and/or the controller/processor 675.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
monitoring, at a user equipment (UE), for control information in a first control region and a second control region of a subframe, the first control region and the second control region not overlapping in time;
receiving, at the UE, the control information in the first control region or the second control region, wherein a maximum transport block size for a downlink transmission is based at least in part on whether the control information is received in the first control region or the second control region, the maximum transport block size has a first size when the control information is received in the first control region that only occupies a first slot of the subframe, the maximum transport block size has a second size when the control information is received in the second control region that occupies both the first slot and a second slot of the subframe, and the first size is different from the second size; and
decoding the control information, wherein a decoding time for the control information is based at least in part on whether the control information is received in the first control region or the second control region.

2. The method of claim 1, in which a common search space in a legacy control region and a user equipment (UE) specific search space in a new control region are monitored for the control information.

3. The method of claim 1, in which a search space for monitoring the first control region and the second control region is based at least in part on an aggregation level.

4. The method of claim 1, in which a plurality of decoding hypotheses are monitored in the first control region or the second control region, the first control region or the second control region having a number of decoding hypotheses that is less than a total number of decoding hypotheses monitored in the subframe.

5. The method of claim 4, in which the plurality of decoding hypotheses in the first control region or the second control region comprise a number of decoding hypotheses that is based at least in part on an aggregation level.

6. The method of claim 4, in which the plurality of decoding hypotheses in the first control region or the second control region comprise a number of decoding hypotheses that is semi-statically configured.

7. The method of claim 1, further comprising transmitting an acknowledgement (ACK) or negative acknowledgement (NAK) in response to receiving at least the control information, a time between receiving the control information and transmitting the ACK or NAK being based at least in part on the maximum transport block size.

8. The method of claim 1, in which the maximum transport block size is based at least in part on a function of available decoding time or a duration of an enhanced physical downlink control channel (ePDCCH).

9. A user equipment (UE) for wireless communication, comprising:
a memory; and
at least one processor coupled to the memory, the at least one processor being configured:
to monitor for control information in a first control region and a second control region of a subframe, the first control region and the second control region not overlapping in time;
to receive the control information in the first control region or the second control region, wherein a maximum transport block size for a downlink transmission is based at least in part on whether the control information is received in the first control region or the second control region, the maximum transport block size has a first size when the control information is received in the first control region that only occupies a first slot of the subframe, the maximum transport block size has a second size when the control information is received in the second control region that occupies both the first slot and a second slot of the subframe, and the first size is different from the second size; and
to decode the control information, wherein a decoding time for the control information is based at least in part on whether the control information is received in the first control region or the second control region.

10. The UE of claim 9, in which the at least one processor is configured to monitor a common search space in a legacy control region and a user equipment (UE) specific search space in a new control region for the control information.

11. The UE of claim 9, in which a search space for monitoring the first control region and the second control region is based at least in part on an aggregation level.

12. The UE of claim 9, in which the at least one processor is configured to monitor a plurality of decoding hypotheses in the first control region or the second control region, the first control region and the second control region having a number of decoding hypotheses that is less than a total number of decoding hypotheses monitored in the subframe.

13. The UE of claim 12, in which the plurality of decoding hypotheses in the first control region or the second control region comprise a number of decoding hypotheses that is based at least in part on an aggregation level.

14. The UE of claim 12, in which the plurality of decoding hypotheses in the first control region or the second control region comprise a number of decoding hypotheses that is semi-statically configured.

15. The UE of claim 9, in which the at least one processor is further configured to transmit an acknowledgement (ACK) or negative acknowledgement (NAK) in response to receiving at least the control information, a time between receiving the control information and transmitting the ACK or NAK being based at least in part on the maximum transport block size.

16. The UE of claim 9, in which the maximum transport block size is based at least in part on a function of available decoding time or a duration of an enhanced physical downlink control channel (ePDCCH).

17. A non-transitory computer-readable medium having non-transitory program code recorded thereon for wireless communication, the program code comprising:
program code to monitor, at a user equipment (UE), for control information in a first control region and a second control region of a subframe, the first control region and the second control region not overlapping in time;
program code to receive, at the UE, the control information in the first control region or the second control region, wherein a maximum transport block size for a downlink transmission is based at least in part on whether the control information is received in the first control region or the second control region, the maximum transport block size has a first size when the control information is received in the first control region that only occupies a first slot of the subframe, the maximum transport block size has a second size when the control information is received in the second control region that occupies both the first slot and a second slot of the subframe, and the first size is different from the second size; and
program code to decode the control information, wherein a decoding time for the control information is based at least in part on whether the control information is received in the first control region or the second control region.

18. The non-transitory computer-readable medium of claim 17, in which the program code further comprises program code to transmit an acknowledgement (ACK) or negative acknowledgement (NAK) in response to receiving at least the control information, a time between receiving the control information and transmitting the ACK or NAK being based at least in part on the maximum transport block size.

19. The non-transitory computer-readable medium of claim 17, in which the maximum transport block size is based at least in part on a function of available decoding time or a duration of an enhanced physical downlink control channel (ePDCCH).

20. An apparatus for wireless communication, comprising:
means for monitoring, at a user equipment (UE), for control information a first control region and a second control region of a subframe the first control region and the second control region not overlapping in time;
means for receiving, at the UE, the control information in the first control region or the second control region, wherein a maximum transport block size for a downlink transmission is based at least in part on whether the control information is received in the first control region or the second control region, the maximum transport block size has a first size when the control information is received in the first control region that only occupies a first slot of the subframe, the maximum transport block size has a second size when the control information is received in the second control region that occupies both the first slot and a second slot of the subframe, and the first size is different from the second size; and
means for decoding the control information, wherein a decoding time for the control information is based at least in part on whether the control information is received in the first control region or the second control region.

21. The apparatus of claim 20, further comprising means for transmitting an acknowledgement (ACK) or negative acknowledgement (NAK) in response to receiving at least the control information, a time between receiving the control information and transmitting the ACK or NAK being based at least in part on the maximum transport block size.

22. The apparatus of claim 20, in which the maximum transport block size is based at least in part on a function of available decoding time or a duration of an enhanced physical downlink control channel (ePDCCH).

* * * * *